June 16, 1936.    F. L. MYERS ET AL    2,044,221
FRAMEWORK FOR AIR FILTERS
Filed Jan. 29, 1934    2 Sheets-Sheet 2
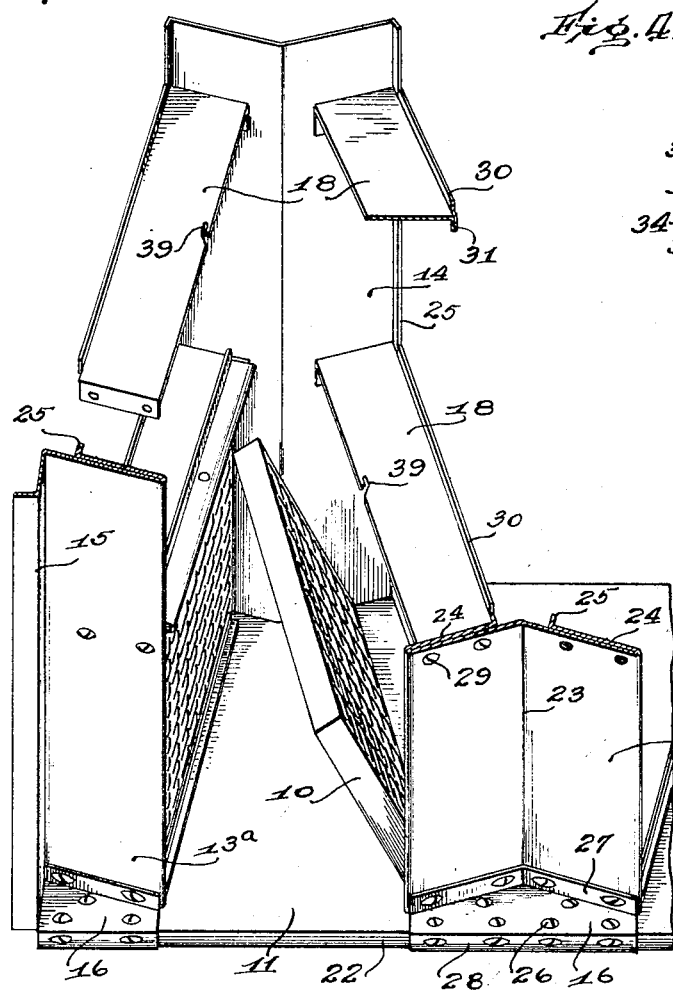
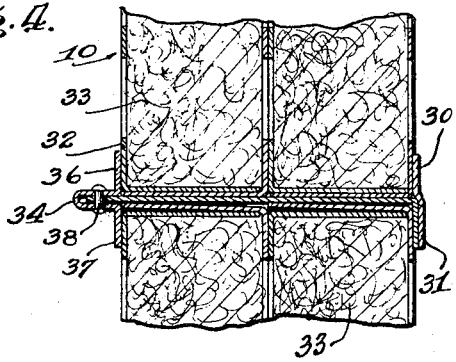
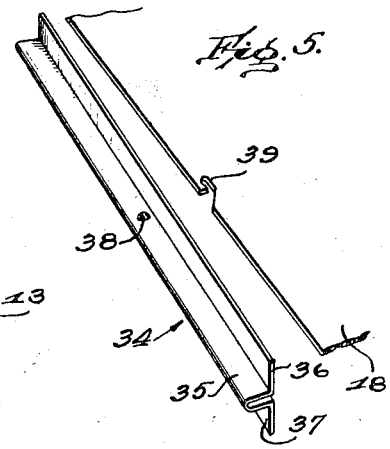
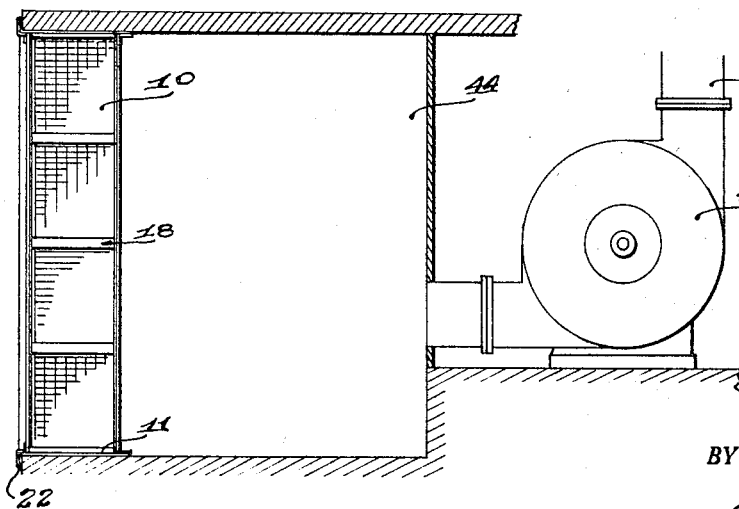
INVENTORS
Frank L. Myers and
Harry V. Smith
BY
J. F. Rule
ATTORNEY Patented June 16, 1936

2,044,221

UNITED STATES PATENT OFFICE 2,044,221

FRAMEWORK FOR AIR FILTERS

Frank L. Myers and Harry V. Smith, Toledo, Ohio, assignors to Owens-Illinois Glass Company, a corporation of Ohio Application January 29, 1934, Serial No. 708,719

13 Claims. (Cl. 183—44)

Our invention relates to air filter systems of the type in which a bank of filter units are assembled in a framework for installation in any desired situation, as for example an opening provided therefor in the wall of a building. In filter systems of this type the individual filter units comprised in the installation are ordinarily arranged with their exposed faces all lying in the same plane, parallel with the wall or opening in which they are installed. With such arrangement the aggregate area of such exposed filter unit faces or surfaces is no greater than the area of the opening in which they are installed and is usually substantially less owing to the space occupied by the framework between the adjoining filter units. The capacity of the filter system as a whole is determined by and proportional to the surface area or extent of the filter units thus exposed.

An object of our invention is to greatly increase the capacity of a bank of filters designed for installation in a wall opening or other space of predetermined area as compared with the usual arrangement in which the filters are parallel with the opening. To the attainment of this end the invention provides a framework for supporting the filter units in V-shape or zigzag formation with each two laterally adjoining filter units arranged in the form of a V. In this manner a comparatively large number of units may be installed in an opening of any given dimensions so that the total number of units installed, and therefore the total filtering area, is greatly increased as compared with the usual arrangement in which all the units are arranged in the same or parallel planes.

A further object of the invention is to provide a simple and practical form of framework for the filter units by which they are securely held in position and air leakage prevented, the construction being such as to permit the filter units to be quickly and easily removed and replaced by other units. The invention further provides interchangeable parts which may be assembled into a framework of any desired size within predetermined limits.

Other objects of the invention will appear hereinafter.

Figure 1:
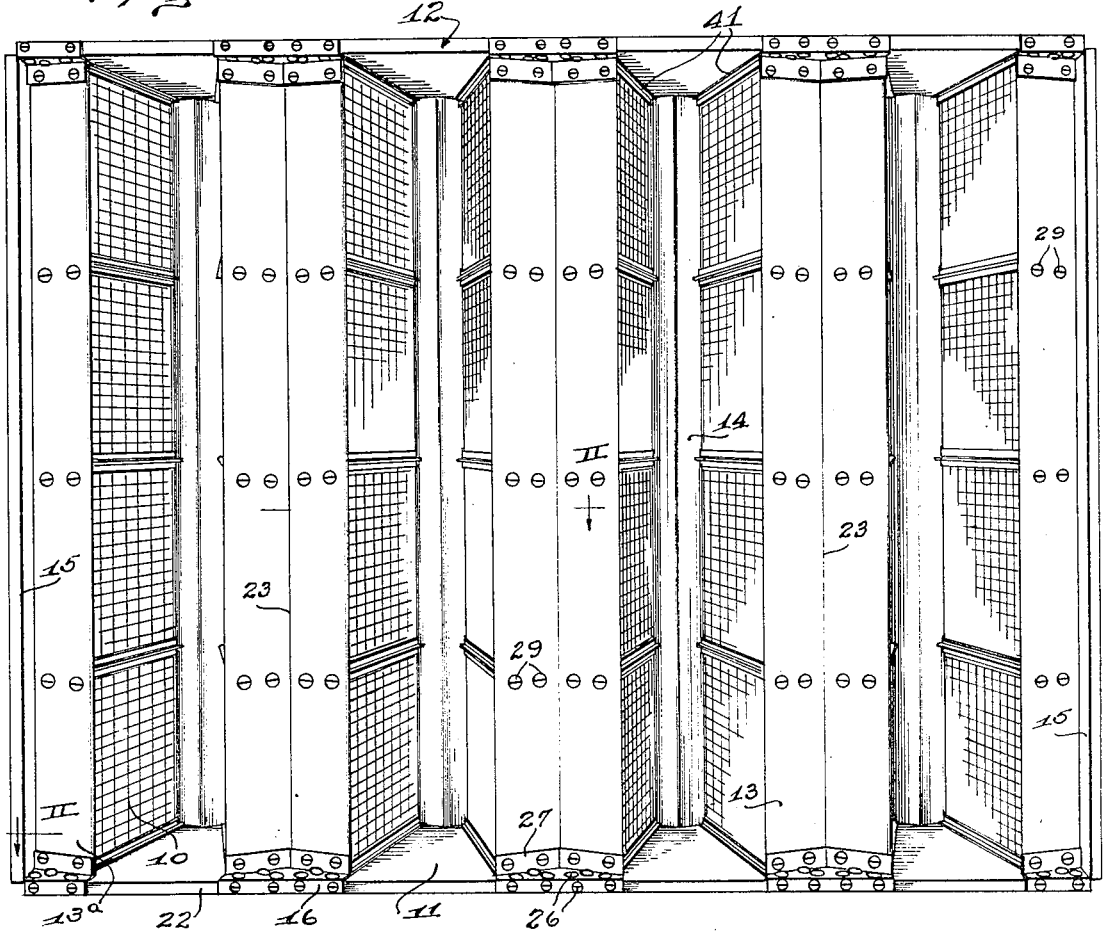
Figure 2:
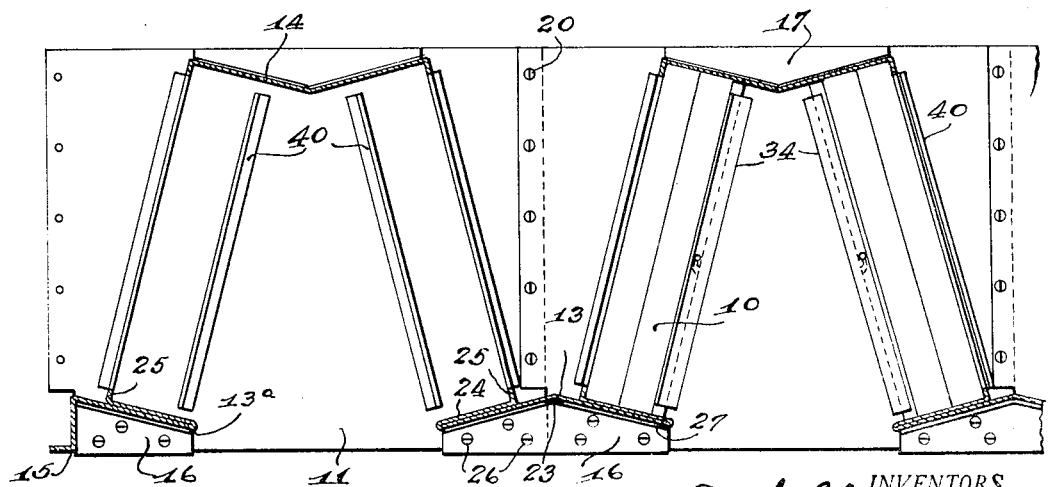

Referring to the accompanying drawings, Fig. 1 is a front perspective view of a filter framework with the filter units assembled therein. Fig. 2 is a fragmentary sectional plan at the line II—II on Fig. 1. Fig. 3 is a fragmentary perspective view showing a portion of the framework and the method of placing the filter units therein. Fig. 4 is a fragmentary sectional elevation through a horizontal member of the framework and the adjoining filter units. Fig. 5 is a perspective view of a retaining strip and a frame member to which it is adapted to be attached. Fig. 6 is a fragmentary sectional elevation showing a filter installation including a bank of filters and means for circulating air therethrough.

In the drawings we have illustrated a bank of rectangular filter units 10 installed in a framework adapted to be fitted within a rectangular opening in the wall of a building or the like. The framework comprises a lower horizontally disposed deck plate 11, an upper horizontal deck plate 12, vertical front and rear guide posts or risers 13 and 14 respectively, vertical end frame members or risers 13ª, front and rear foot pieces 16 and 17 respectively, by which the guide posts are attached to the deck plates, and horizontal cross bars or frame members 18 uniting the front and rear risers and spaced at intervals vertically thereof. The framework as shown, is made throughout of interchangeable sheet metal parts bolted or otherwise secured together. The lower deck plate 11 may be made up of a number of individual rectangular plates or units which may be identical in construction, said plates having their adjoining ends overlapping and secured together as by means of screws or screw bolts 20, the total length of the plate being thus made to correspond with the size of the opening in which it is to be installed. The front margin of the plate 11 may be turned down to form a vertical flange 22 to extend down over the edge of the wall therebeneath when the frame is installed. The upper deck plate 12 is also preferably made in sections, being similar or identical in construction with the lower deck plate.

The guide posts or risers 13 and 14 extend vertically from the lower to the upper deck plate. Each riser comprises a flat sheet metal plate bent along its vertical median line 23 so that each half of the plate forms a vertical end wall for a tier of filter units. The risers may include sections or portions 24 bent back upon themselves, the margins of said portions 24 being bent outwardly at right angles to form vertical flanges 25. The rear risers 14 are preferably of similar construction to the front risers except that the vertical flanges are formed at the outer edges of the risers, the portions 24 being omitted. The foot pieces 16, by which the front risers are attached to the deck plates are in the form of angle bars secured to the deck plate by attaching means 26, such as bolts or screws, each foot piece having upturned flange portions 27 (Fig. 3) for attachment in like manner to the riser and a front flange 28 for attachment to the flange 22 of the deck plate. The rear foot pieces 17 are preferably of the same construction as the front foot pieces 16 and interchangeable therewith. They may be bolted, welded or otherwise secured to the deck plate and risers.

The cross bars or frame members 18 extend horizontally between the front and rear risers and have their end portions bent vertically downward and secured to the guide posts by screws 29 or other means. Each cross piece 18 is provided with upper and lower flanges 30 and 31 respectively, extending lengthwise thereof along its rear edge to provide abutments for the filter units. The cross pieces 18 are spaced vertically at the required positions to form with the risers, rectangular cells in which the filter units 10 are fitted.

The filter units may be of conventional or any approved construction. As herein shown, each unit comprises a carton or cover made in telescoping sections 32 to receive a pad 33 of filter material which may consist, for example, of glass wool, having a coating of oily or viscous material to which dust will adhere. As indicated in Fig. 4 two filter units may be placed in superposed relation in each cell. The top and bottom edges of the inner unit abut against the flanges 31 and 30 respectively, the side edges in like manner abutting against the vertical flanges 25 on the risers.

Associated with each cross piece 18 is a retaining strip 34 (Figs. 4 and 5) which is bent to form a horizontally disposed U-shaped body 35 and vertically disposed upper and lower flanges 36 and 37 respectively. When the filter units have been placed in position within their respective cells, they are held in place by means of the retaining strips 34 which fit over the cross bars 18, the front edges of said bars entering the U-shaped portions 35 of the retaining strips. The latter are locked in position by means of a locking pin 38 which engages a bayonet slot 39 in the bar 18.

Angle bars 40 (Fig. 2) which may be welded to the deck plate 11 provide abutment flanges for the lower ends of the lowermost filter units. Angle bars 41 (Fig. 1) may likewise be attached to the upper deck plate 12 and provide abutments for the upper edges of the uppermost filter units. The end risers 13ᵃ are only half the width of the intermediate risers 13 as they form the end members of only a single tier of filter units. The end risers 13ᵃ may be formed with flanges 15 to overlie the adjoining edge of the wall in which the framework is fitted.

The arrangement of the framework is such that the filter units when in position therein are arranged in vertical planes inclined to the vertical plane of the framework as a whole, or more exactly, the vertical plane of marginal flanges 15, which vertical plane is coincident with or parallel to the face of the opening in which the bank of filters is installed. The faces of the filter units are preferably at an obtuse angle to the said vertical plane. The front and rear risers are arranged in staggered relation and each two adjoining tiers of filter units, hereinafter referred to as a group, are arranged in the form of a V, the entire bank of filters being in zigzag formation. In this manner a large surface area of filter units is provided, the number of units installed being much greater than is possible when the filter units are parallel with the wall or wall opening which receives the bank of filters. Ordinarily the thickness of the wall which is to receive the bank of filters is sufficient to permit such arrangement without projecting the filter framework materially beyond the front or rear faces of the wall. It will be observed that the arrangement is such that the individual filter units are readily accessible for removal and replacement.

It will be noted that the deck plates are made up of individual sections, each of a length to accommodate a V group of filter units. This permits the framework as a whole to be built up to any desired horizontal length, to correspond to the length of the opening or space designed to receive the installation. The risers may be made in standard lengths, permitting the bank of filters to be built up to any desired height or including any desired number of filter units in a vertical tier.

Fig. 6 illustrates a bank of filter units installed in the wall of a room 44. A circulation of air through the filters is provided by a fan or blower 45 which may be operated in a manner to draw the air from the room 44 and force it through a conduit 46 leading to the rooms or spaces which are to be supplied with the filtered air.

Modifications may be resorted to within the spirit and scope of our invention.

What we claim is:

1. A framework providing rectangular cells, said framework including a horizontal frame member forming a wall of two adjoining cells, a retaining member for holding cell filling units in position in said cells, said retaining member comprising a strip extending along said frame member in position to project over a marginal portion of an adjoining cell opening for holding a unit in position in the cell, and means for removably attaching said retaining member to the frame member.

2. A framework providing rectangular cells, said framework including a horizontal frame member forming a wall of two adjoining cells, a retaining member for holding cell filling units in position in said cells, said retaining member comprising a strip extending along said frame member in position to project over a marginal portion of an adjoining cell opening for holding a unit in position in the cell, and means for removably attaching said retaining member to the frame member, said attaching means comprising a bayonet slot provided in one said member and a pin on the other member.

3. A framework providing rectangular cells, said framework including a horizontal frame member forming a wall of two adjoining cells, a retaining member for holding cell filling units in position in said cells, said retaining member comprising a strip of sheet material bent to form a U-shaped body to embrace the marginal portion of said frame member and vertical flanges to project above and below said frame member and form abutments for units within said cells, said frame member having a bayonet slot, and a pin on said retaining member to engage said slot for removably holding the retaining member in operative position.

4. A framework for filter units comprising upper and lower parallel horizontal deck plates forming the upper and lower members respectively of the framework, a series of front vertical risers and a parallel series of rear vertical risers extending from the lower to the upper deck plates and attached at their ends to the deck plates, horizontal cross members extending from the front to the rear risers and vertically spaced from each other to provide with said risers, rectangular cells arranged in tiers for the reception of the filter units.

5. A framework for filter units comprising upper and lower parallel horizontal deck plates forming the upper and lower members respectively of the framework, a series of front vertical risers and a parallel series of rear vertical risers extending from the lower to the upper deck plates and attached at their ends to the deck plates, horizontal cross members extending from the front to the rear risers and vertically spaced from each other to provide with said risers, rectangular cells arranged in tiers for the reception of the filter units, the front and rear risers being arranged in staggered relation, whereby the tiers of cells are diagonally arranged in zig-zag formation.

6. A framework for filter units comprising upper and lower parallel horizontal deck plates forming the upper and lower members respectively of the framework, a series of front vertical risers and a parallel series of rear vertical risers extending from the lower to the upper deck plates and attached at their ends to the deck plates, horizontal cross members extending from the front to the rear risers and vertically spaced from each other to provide with said risers, rectangular cells arranged in tiers for the reception of the filter units, the front and rear risers being arranged in staggered relation, whereby the tiers of cells are diagonally arranged in zig-zag formation, each of said risers extending laterally across two adjoining tiers of said cells and forming the end members therefor.

7. A framework for filter units comprising upper and lower parallel horizontal deck plates forming the upper and lower members respectively of the framework, a series of front vertical risers and a parallel series of rear vertical risers extending from the lower to the upper deck plates and attached at their ends to the deck plates, horizontal cross members extending from the front to the rear risers and vertically spaced from each other to provide with said risers, rectangular cells arranged in tiers for the reception of the filter units, removable members perpendicularly disposed to said cross members for retaining said cells, and means providing slot and pin connections between the retaining members and said cross members for removably holding the retaining members in place.

8. A framework for filter units comprising upper and lower parallel horizontal deck plates forming the upper and lower members respectively of the framework, a series of front vertical risers and a parallel series of rear vertical risers extending from the lower to the upper deck plates and attached at their ends to the deck plates, horizontal cross members extending from the front to the rear risers and vertically spaced from each other to provide with said risers, rectangular cells arranged in tiers for the reception of the filter units, the front and rear risers being arranged in staggered relation, whereby the tiers of cells are diagonally arranged in zig-zag formation, each of said risers extending laterally across two adjoining tiers of said cells and forming the end members therefor, T-shaped retaining members, and means providing slot and pin connections between the retaining members and said cross members for removably holding the retaining members in place.

9. A framework for filter units comprising upper and lower parallel horizontal deck plates forming the upper and lower members respectively of the framework, at least one rear vertical riser and a corresponding plurality of front vertical risers arranged parallel thereto, said risers extending from the lower to the upper deck plates and attached at their ends to the deck plates, horizontal cross members extending from the front to the rear risers and vertically spaced from each other to provide with said risers, rectangular cells arranged in tiers for the reception of the filter units.

10. A framework for filter units comprising upper and lower parallel horizontal deck plates forming the upper and lower members respectively of the framework, at least one rear vertical riser and a corresponding plurality of front vertical risers arranged parallel thereto, said risers extending from the lower to the upper deck plates and attached at their ends to the deck plates, horizontal cross members extending from the front to the rear risers and vertically spaced from each other to provide with said risers, rectangular cells arranged in tiers for the reception of the filter units, the front and rear risers being arranged in staggered relation, whereby the tiers of cells are diagonally arranged in zig-zag formation.

11. A framework for filter units comprising upper and lower parallel horizontal deck plates forming the upper and lower members respectively of the framework, at least one rear vertical riser and a corresponding plurality of front vertical risers arranged parallel thereto, said risers extending from the lower to the upper deck plates and attached at their ends to the deck plates, horizontal cross members extending from the front to the rear risers and vertically spaced from each other to provide with said risers, rectangular cells arranged in tiers for the reception of the filter units, the front and rear risers being arranged in staggered relation, whereby the tiers of cells are diagonally arranged in zig-zag formation, each of said risers extending laterally across two adjoining tiers of said cells and forming the end members therefor.

12. A framework for filter units comprising at least one set of upper and lower parallel horizontal deck plates forming upper and lower members respectively of the framework, a rear vertical riser and two front vertical risers for each of said sets extending from the lower to the upper deck plates and attached at their ends to the deck plates, and horizontal cross members extending from the front to the rear risers and vertically spaced from each other to provide with said risers, rectangular cells arranged in tiers for the reception of the filter units, the front and rear risers being arranged in staggered relation whereby the tiers are diagonally arranged in zig-zag formation.

13. A framework for filter units comprising at least one set of upper and lower parallel horizontal deck plates forming upper and lower members respectively of the framework, a rear vertical riser and two front vertical risers for each of said sets extending from the lower to the upper deck plates and attached at their ends to the deck plates, and horizontal cross members extending from the front to the rear risers and vertically spaced from each other to provide with said risers, rectangular cells arranged in tiers for the reception of the filter units, the front and rear risers being arranged in staggered relation whereby the tiers are diagonally arranged in zig-zag formation, the adjacent front risers of adjacent sets being constructed integrally.

FRANK L. MYERS.
HARRY V. SMITH.